(12) United States Patent
Hecht (10) Patent No.: US 9,038,986 B2
(45) Date of Patent: May 26, 2015

(54) FLOW SHUT-OFF VALVE DEVICE

(71) Applicant: Automatic Bar Controls, Inc., Vacaville, CA (US)

(72) Inventor: Thomas R. Hecht, Winters, CA (US)

(73) Assignee: Automatic Bar Controls, Inc., Vacaville, CA (US)

( * ) Notice: Subject to any disclaimer, the term of this patent is extended or adjusted under 35 U.S.C. 154(b) by 0 days.

(21) Appl. No.: 13/761,107

(22) Filed: Feb. 6, 2013

(65) Prior Publication Data

US 2013/0200287 A1 Aug. 8, 2013

Related U.S. Application Data

(60) Provisional application No. 61/595,752, filed on Feb. 7, 2012.

(51) Int. Cl.
| | |
|---|---|
| *F16K 25/00* | (2006.01) |
| *F16K 7/12* | (2006.01) |
| *F16K 1/04* | (2006.01) |
| *F16K 31/524* | (2006.01) |

(52) U.S. Cl.
CPC ... *F16K 7/12* (2013.01); *F16K 1/04* (2013.01); *F16K 31/52425* (2013.01)

(58) Field of Classification Search
CPC ............ F16K 31/52408; F16K 31/52416; F16K 31/52425; F16K 31/52433; F16K 31/52; F16K 31/522
USPC ......... 251/251, 252, 253, 254, 255, 256, 264, 251/318, 218; 137/15.18, 15.19, 315.27
See application file for complete search history.

(56) References Cited

U.S. PATENT DOCUMENTS

| | | | | | |
|---|---|---|---|---|---|
| 17,604 | A | * | 6/1857 | Coffin, Jr. ................ | 251/255 |
| 614,517 | A | * | 11/1898 | Taylor .................... | 251/218 |
| 1,066,820 | A | * | 7/1913 | Kelly ..................... | 251/218 |
| 1,142,389 | A | * | 6/1915 | Allan ..................... | 251/253 |
| 1,204,588 | A | * | 11/1916 | Pocock .................. | 251/253 |
| 1,363,125 | A | * | 12/1920 | Kickham ................ | 251/254 |
| 1,429,637 | A | * | 9/1922 | Russell .................. | 251/256 |
| 1,436,650 | A | * | 11/1922 | Gilbert ................... | 251/256 |

(Continued)

FOREIGN PATENT DOCUMENTS

EP      1 909 004 A1     4/2008

OTHER PUBLICATIONS

Extended European Search Report of Application No. 13154263.1; dated Apr. 1, 2014. 7 pages.

*Primary Examiner* — Marina Tietjen
(74) *Attorney, Agent, or Firm* — Kilpatrick Townsend & Stockton LLP (57) ABSTRACT

A valve assembly having a valve-seal on a valve member that moves between an open and a closed position within a valve support housing for controlling fluid flow, particularly for use as a shut-off valve. In many embodiments, advancing the valve member sealingly engages the valve-seal with a valve seating area of the housing to close the valve and shut-off fluid flow through the housing, while retracting the valve member moves the valve-seal away from the seating area to allow fluid flow around the valve-seal and through the valve-seating area. In many embodiments, the valve member includes a proximal handle and angled ramp that engage with a helical ramp of the housing to translate rotation of the handle into axial movement of the member between open and closed positions.

19 Claims, 10 Drawing Sheets

(56) References Cited

U.S. PATENT DOCUMENTS

| | | | | |
|---|---|---|---|---|
| 1,505,650 A | * | 8/1924 | Lewis | 251/256 |
| 2,498,608 A | * | 2/1950 | Raybould | 251/256 |
| 2,664,265 A | * | 12/1953 | Howser | 251/253 |
| 4,027,851 A | * | 6/1977 | Schlotman | 251/172 |
| 4,316,481 A | | 2/1982 | Fillman | |
| 4,557,288 A | * | 12/1985 | Botnick | 137/315.13 |
| 4,648,534 A | * | 3/1987 | Esser | 222/373 |
| 5,106,055 A | * | 4/1992 | Phillips | 251/264 |
| 5,226,453 A | * | 7/1993 | Biggers et al. | 137/801 |
| 2001/0017361 A1 | | 8/2001 | Kerger et al. | |

* cited by examiner

ON POSITION

FIG. 1A
(PRIOR ART)

OFF POSITION

Section C-C

Section C'-C'

FLOW SHUT-OFF VALVE DEVICE

CROSS-REFERENCES TO RELATED APPLICATIONS

The present application claims the benefit under 35 USC §119(e) of U.S. Provisional Application No. 61/595,752 filed Feb. 7, 2012, the full disclosure of which is incorporated herein by reference in its entirety for all purposes.

BACKGROUND OF THE INVENTION

1. Field of the Invention

The present invention relates to a valve assembly which can be used to regulate fluid flow, particularly for use as a shut-off valve.

2. Related Art

In many conventional shut-off valves, a sealing member is rotated between an open and closed position, the sealing member completely blocking a fluid flow path in the closed position and the valve allowing fluid flow through a lumen extending through the shut-off valve in the open position. Typically, when the sealing member is in the open position, the lumen is aligned with the fluid flow and turning the valve by 90 degrees in either direction rotates the sealing member and turns the lumen perpendicular to the flow path, thereby shutting off fluid flow. To provide a sufficiently tight seal, particularly when the fluid is pressurized, the sealing member is typically constructed from elastomeric materials, such as rubber. One drawback of these conventional shut-off valves is that the seal typically degrades over time, eventually allowing fluid to leak when the valve is in the closed position.

The valve-seal may become compromised for a variety of reasons, including differences in tolerances of the sealing member and fluid conduit, parting lines, debris, and sealing defects due to the elastomer "taking a set." Additionally, the force of the fluid upstream of the seal may compromise the effectiveness of the seal and may make movement of the sealing member between the open positions difficult. Often, in conventional sealing devices, when the sealing member is disposed in the open configuration over time, the force of the fluid may press the seal against the walls of the conduit causing the elastomeric seal to take a "set" and retain its shape in the open position, even when moved into the closed position. This retained shape or "set" reduces the effectiveness of the seal in the closed position, eventually allowing fluid to leak past the seal in the closed position.

It is an object of the present invention to provide an improved shut-off valve that alleviates one or more of the above drawbacks of conventional shut-off valves.

BRIEF SUMMARY OF THE INVENTION

Embodiments described herein provide a shut-off valve device for use in regulating fluid flow. In an example embodiment, the shut-off valve includes a valve-seal on a valve member moveable relative to a valve support housing or frame through which fluid flows. When in the closed position, the valve-seal is engaged against a valve seating area of the valve support frame so as to block the fluid flow through the valve housing. When in the open position, the valve-seal is retracted away from the valve seat so as to allow fluid flow through the support housing. The present invention is particularly advantageous when used in a variety of fluid dispensing systems, including soda dispensers as well systems for dispensing oil and other fluids.

In many embodiments, the valve-seal includes a seal having a bulbous geometry that engages against and deforms against a seating surface area, thereby blocking the fluid flow path through the seating surface area. Often, the bulbous valve-seal is spherical, semi-spherical, or concave, such that the spherical, semi-spherical surface engages with an angled or curved valve seating member to create a seal sufficient to block fluid flow. Typically, the valve-seal is made from a deformable material, such as rubber or an elastomer, so that when advanced against the seating surface, deformation of the valve-seal provides an improved seal to ensure complete shut-off of fluid flow through the seating area.

In one aspect, the valve member moves axially between an open and closed positions. The valve member includes a distal valve-seal such that when the valve member is advanced in a distal direction along its longitudinal axis, the valve-seal sealingly engages the valve seating area, and when the valve member is axially retracted, the valve-seal disengages from the valve seating area and allows fluid flow therethrough. Advantageously, when disengaged, the portion of the valve-seal that provides the seal is not in contact with the fluid flow conduit of the housing, thereby preventing the valve-seal from taking a "set" in the open position (since the valve-seal is not being pressed against a surface or deformed when in the open position). In many embodiments, the valve-seal is removably attached to the valve member so as to be replaceable or exchangeable.

In another aspect, the valve member and/or the valve-seal includes a proximal facing surface such that when the valve-seal is engaged against the valve seating area in the closed position, the proximal facing surface is in fluid communication with fluid upstream from the seal so that the force of pressurized fluid against the proximal facing surface exerts a component of force against the valve-seal in the distal direction, thereby creating a positive seal between the valve-seal and the seating area. The proximal facing surface may be a portion of the spherical valve-seal or may include an annular ridge or chamfer on the valve member proximal of the distal valve-seal. In some embodiments, the housing may include an upper chamber proximal of the seating area configured so that pressured fluid within the upper chambers exerts a component of force against the valve member in the distal direction to provide a positive sealing force.

In another aspect, each of the valve member and the valve-support frame includes cooperating angled features, such as ramps, so that rotation of the valve member is translated by the cooperating angled features into longitudinal movement along the valve member. Typically, rotational movement of the valve member in one direction moves the valve-seal toward the seating area into the closed position, while rotational movement of the valve member in the opposite direction moves the valve-seal away from the seating area into the open position. In some embodiments, the support frame and valve member may include threads so that rotation of the valve member may screw the valve-seal into the closed position or unscrew the valve-seal into the open position.

A further understanding of the nature and the advantages of the embodiments disclosed and suggested herein may be realized by reference to the remaining portions of the specification and the attached drawings.

BRIEF DESCRIPTION OF THE DRAWINGS

In order to more fully understand the present embodiments of the invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

Embodiments of the invention are generally directed to shut-off valve for use in regulating fluid flow, particularly in pressurized fluid dispensing systems. Preferably, embodiments are directed to shut-off valves devices having a full-open position for allowing fluid flow therethrough and a full-closed position for shutting off fluid flow entirely.

Figure 1A:
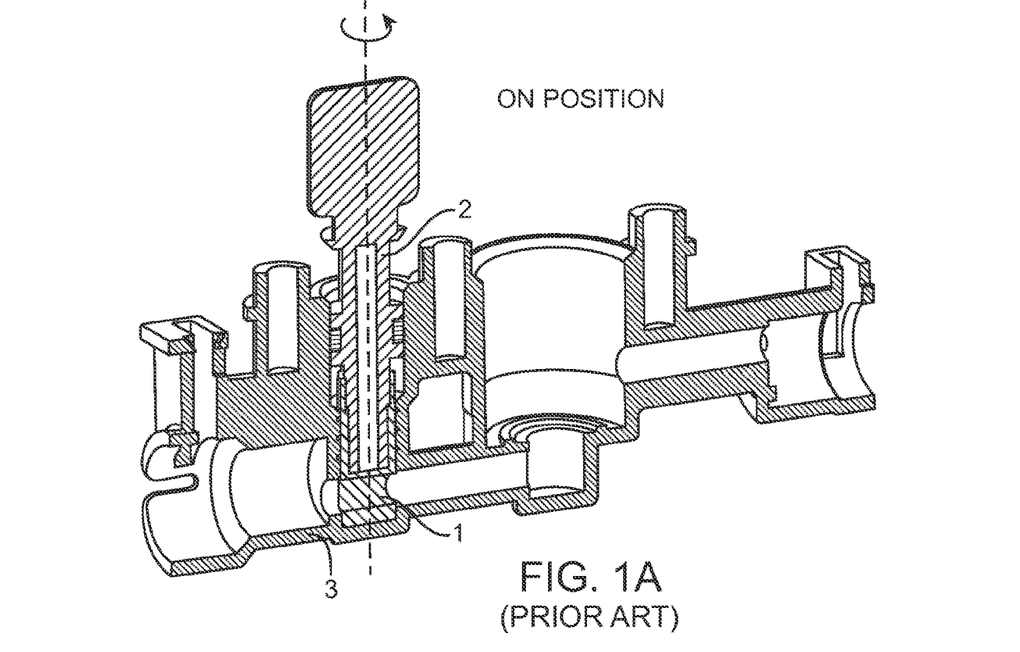
FIGS. 1A-1D illustrate perspective and cross-sectional views of a conventional shut-off valve device according to the prior art.
Figure 1B:
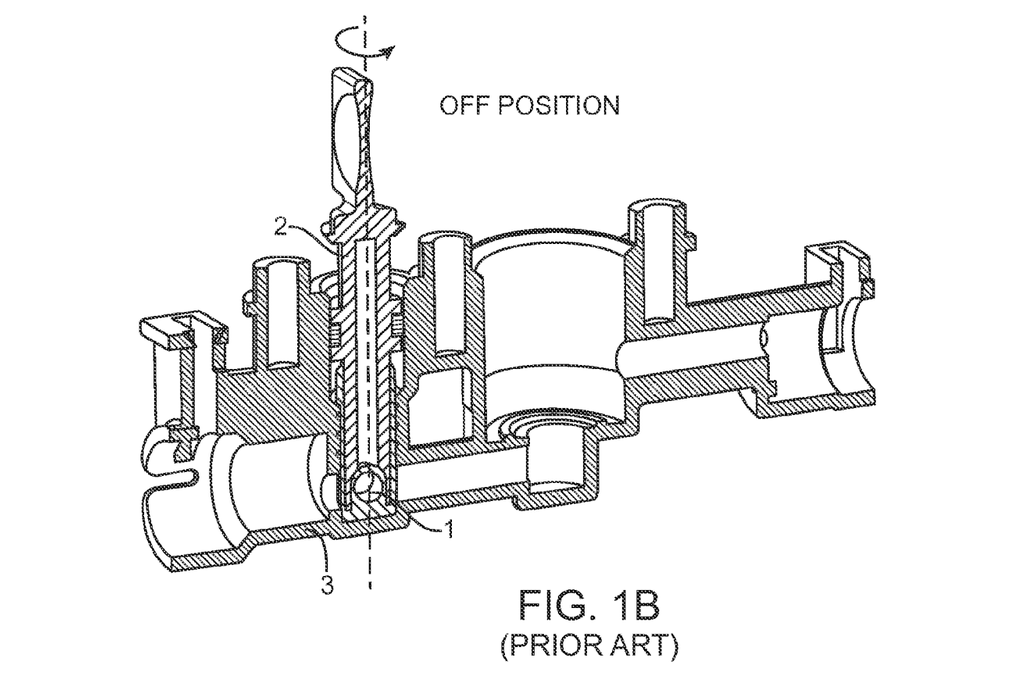
Figure 1C:
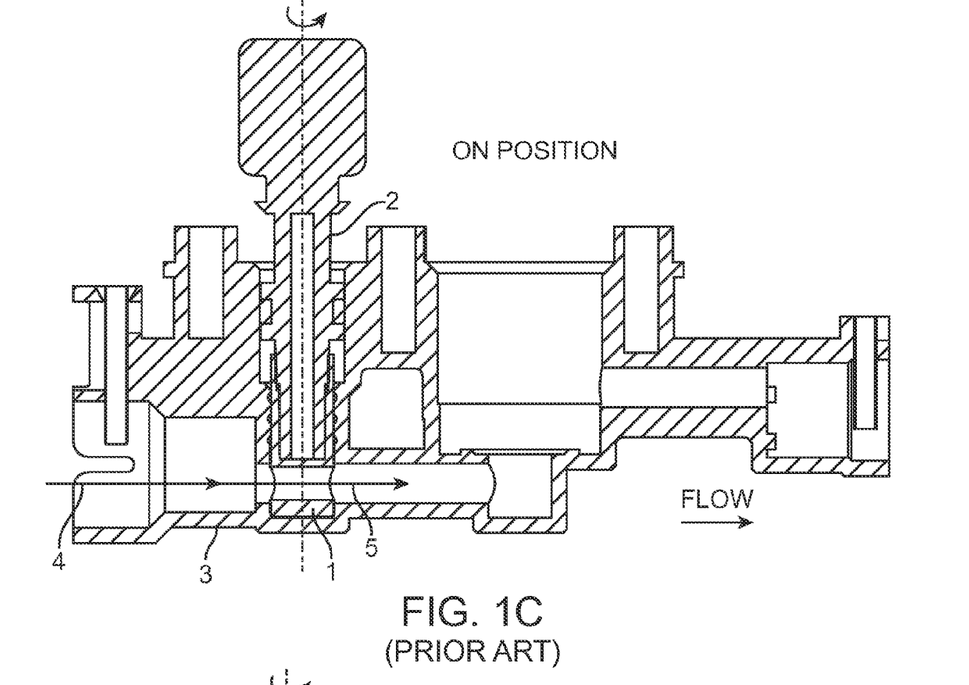
Figure 1D:
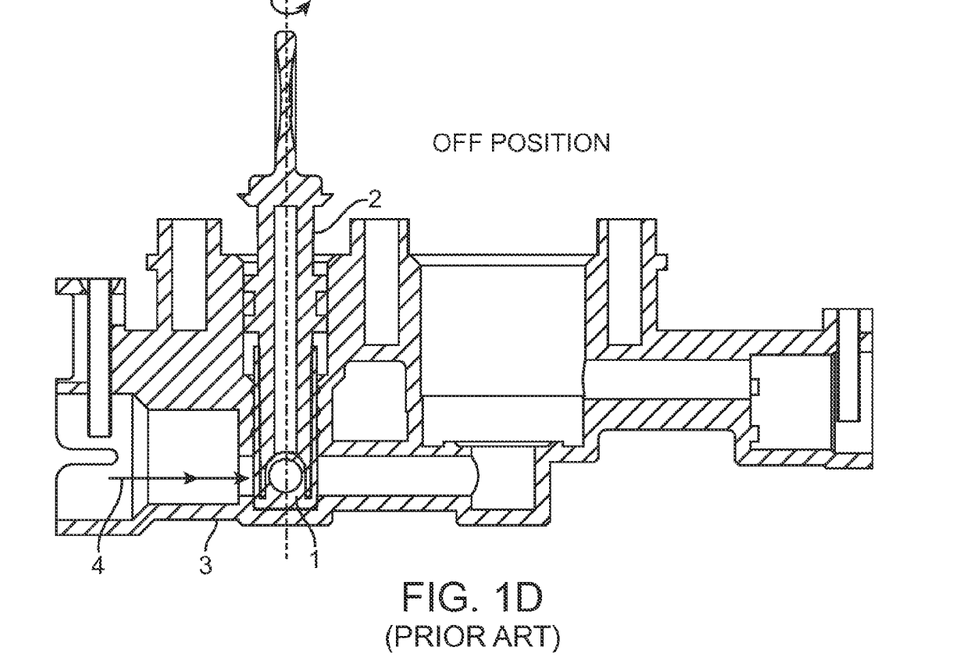

FIGS. 1A-1D illustrate a conventional shut-off valve device having a rotating valve stem 2 that rotates a distal valve-seal 1 at the opposite end between an open position and a closed position. As in many such conventional shut-off valve devices, the valve-seal 1 includes a fluid flow lumen drilled through the center such that when the valve-seal 1 is rotated to align the fluid flow lumen with the fluid flow conduit of the valve device (as shown in FIGS. 1A and 1C), the fluid flows through the device, and when the valve-seal 1 is rotated so that its fluid flow lumen is perpendicular to the fluid flow conduit (as shown in FIGS. 1B and 1D), fluid flow is shut off. Typically, a user must overcome the force of the pressurized fluid flowing through the valve-seal when in the open position to turn the stem into the closed position. Often, the valve-seal is a deformable ball-type seal that rotates within a cylindrical fluid flow conduit between the open and closed position. When in the open position, the force of the pressured fluid presses the valve-seal against a surface of the fluid flow conduit causing that portion of the valve-seal to take a "set" and retain its shape, such that when the valve-seal 1 is rotated into the closed position, the retained shape compromises the seal and allows fluid to leak. Additionally, the force of the upstream fluid flow 4 exerted perpendicular against the valve-seal 1 in the closed position may also reduce the effectiveness of the seal as well as make movement of the valve-seal 1 between the open and closed positions more difficult.

FIGS. 2A-2D illustrate a valve assembly 100 in accordance with many embodiments of the present invention. Valve assembly 100 includes a valve housing 30 having fluid conduits for fluid flow and a valve member 20 that moves between an open position in which fluid flows through valve housing 30, and a closed position in which fluid flow through the housing 30 is shut off. The valve member 20 includes a distal valve-seal 10 and a proximal valve handle 22 for moving the valve-seal 10 between an open and closed position. The valve-seal 10 is configured to engage a valve-seating area 33 within the fluid flow conduit of the housing 30 such that, when engaged, the valve-seal 10 blocks fluid flow through the conduit, and when disengaged from the valve-seating area 33, fluid flows freely through the conduit in housing 30. In this embodiment, the valve is closed by advancing valve-seal 10 against the valve seating area 30, typically by axial movement of the valve member 20 along its longitudinal axial. Typically, the valve-seal is disengaged from the valve-seating area 33 to the open position by axially retracting valve member 20.

In many embodiments, valve member 20 and valve housing 30 are configured so that rotational movement of the valve handle 22 is translated into axial movement of the valve member 20 along its longitudinal axis, such that rotating handle 22 in one direction advances valve-seal 30 toward valve-seating area 33 so as to close the valve assembly 100 and rotating handle 22 in the opposite direction moves the valve-seal 30 away from the valve-seating area 33 so as to allow fluid to pass by the valve-seal 30 and through the conduit of the housing 30. As shown in the detail of FIG. 2C, when the valve-seal 30 is retracted away so as to advance a distal valve-seal 10 against a valve-seating area 33.

In many embodiments, valve-seal 10 comprises a spherical, semi-spherical or convex feature at a distal end of valve member 20. When the closed position, as shown in the detail of FIG. 2D, the spherical surface of valve-seal 10 circumferentially engages valve seating area 33 to block fluid flow. When in the open position, as shown for example in the detail of FIG. 2C, valve member 20 is retracted so that upstream fluid 40 flows through the open valve seating area 33 and downstream 50 of the seating area 33. Typically, the sealing surface (e.g. the distal portion) of the valve-seal 10 is not engaged against a surface of the housing when the valve member is retracted in the open position, as shown in FIG. 2C. This aspect is advantageous as it prevents the valve-seal 10 from "taking a set" in such a way that might cause leakage when the valve 100 is in the closed position, thereby improving the ability of the valve-seal 10 to seal and shut-off fluid flow without leaks while extending the useful life of the valve assembly.

Figure 2A:
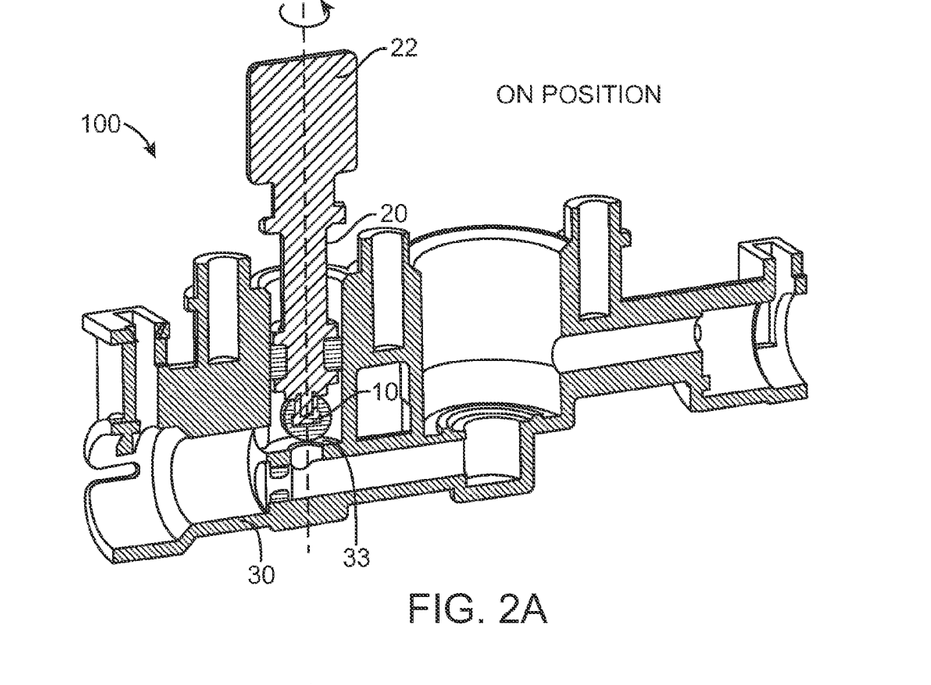
FIGS. 2A-2D illustrate perspective and cross-sectional views of an shut-off valve device, in accordance with many embodiments of the present invention.
Figure 2B:
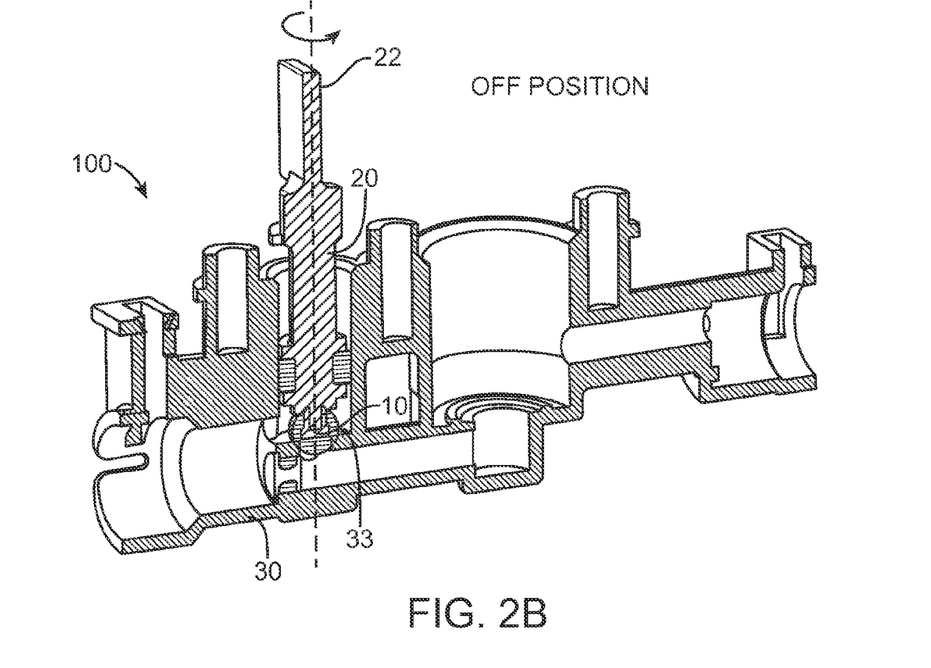
Figure 2C:
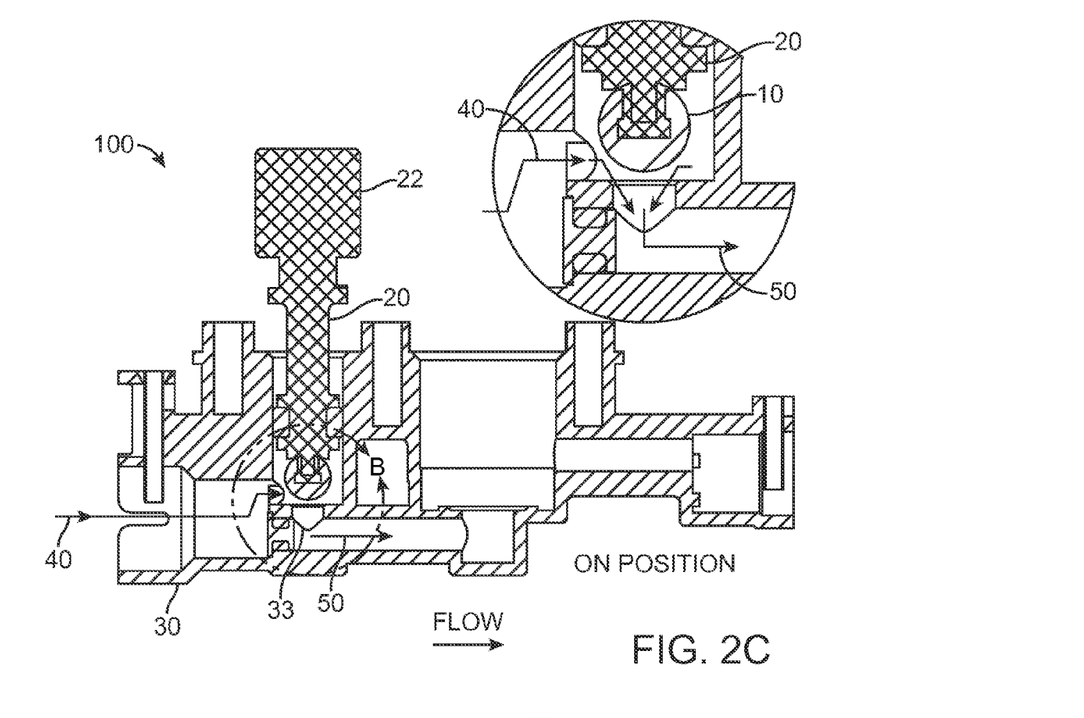
Figure 2D:
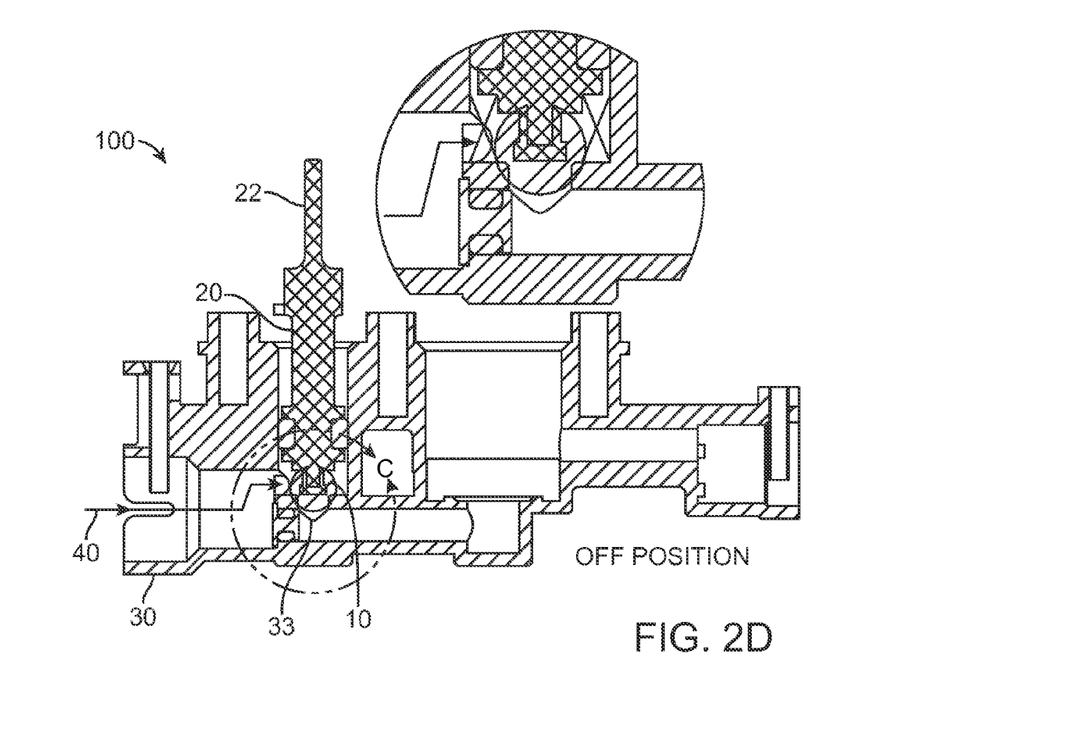

As can be seen in the embodiments of FIGS. 2C and 2D, the fluid flow does not pass through the valve-seal 10, unlike many conventional shut-off valve devices. Rather, the fluid flow is diverted into an upper chamber section so that a more positive ball-seal can be utilized. Advantageously, this aspect utilizes the pressure of the fluid upstream 40 to act on and assist in successful sealing and shut-off of the valve.

FIGS. 3A-3D illustrate an example valve member 20 having a spherical ball type valve-seal 10 disposed on the distal end. Generally, valve-seal 10 is a molded ball or spherical element frictionally secured to the valve member 20. In many embodiments, valve member 20 may include a distal stem 21 that frictionally engages an interior of the valve-seal 10, so that the valve-seal 10 can be pushed on stem 21 and releasably coupled with the valve member. Valve-seal 10 is typically made from a deformable material, such as an elastomer, so as to provide an improved seal between the valve-seating area 33 and the valve-seal. Valve-seal 10 may be made from one or more materials, including but not limited to Silicone, EPDM, Viton®, and Teflon-coated Viton®, depending on the application.

In many embodiments, valve-seal 10 is removable or detachable from valve member 20 so that valve-seal 10 can be replaced or switched out depending on the application of the valve assembly (e.g. different fluids or pressures). For example, the valve-seal can be switched from a Buna-N ball to a Viton seal, or can be replaced with a valve-seal of the same material and a different "hardness" (as measured by a durometer). This feature enables the valve-seal 10 to be replaced over the lifetime of the valve assembly, or to be switched out depending on the application in which the valve-assembly 100 is used.

Figure 3A:
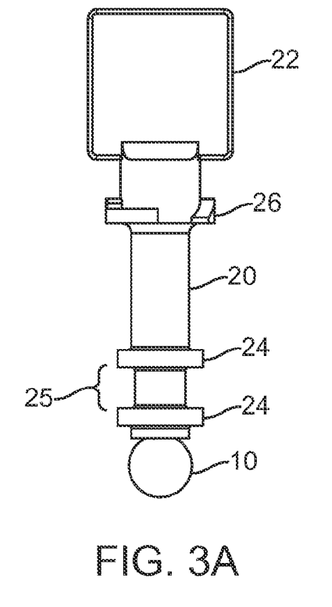
FIGS. 3A-3D illustrate perspective and cross-sectional views of an example valve member and valve-seal, in accordance with many embodiments.
Figure 3B:
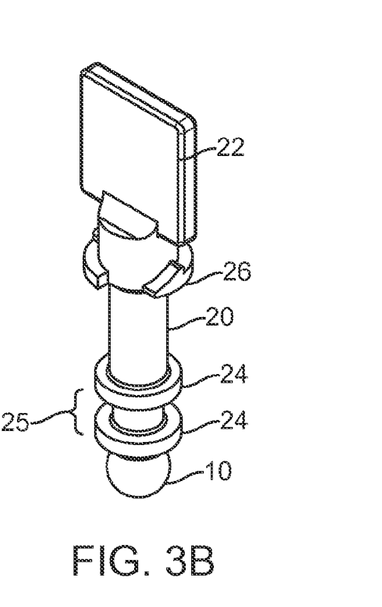
Figure 3C:
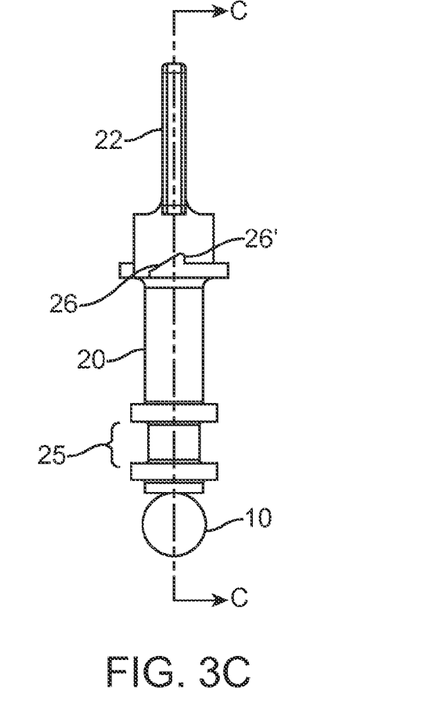
Figure 3D:
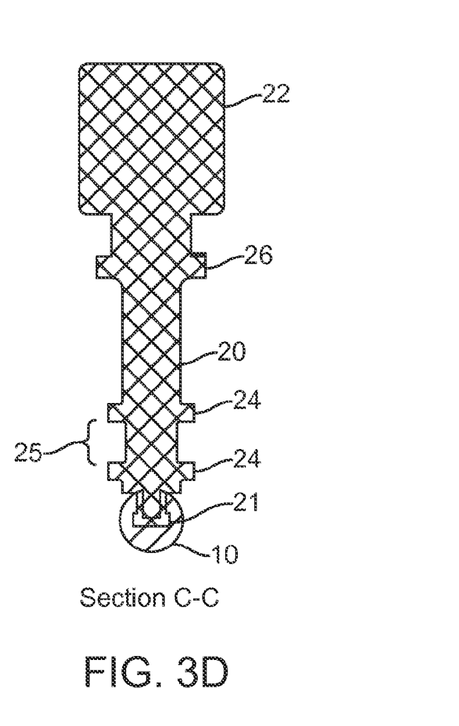
Figure 4A:
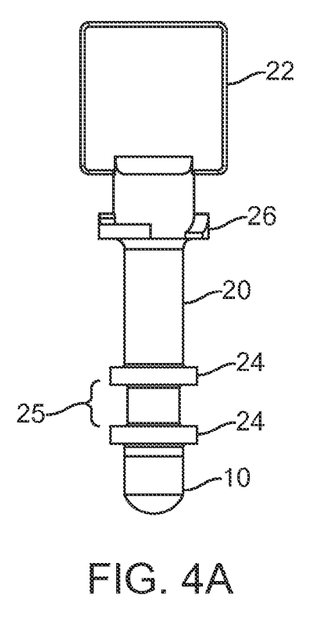
FIGS. 4A-4D illustrate perspective and cross-sectional views of view of another example valve member and valve-seal, in accordance with many embodiments.
Figure 4B:
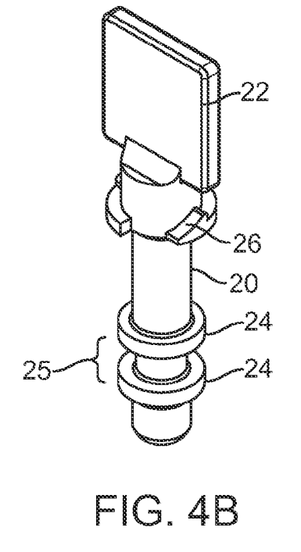
Figure 4C:
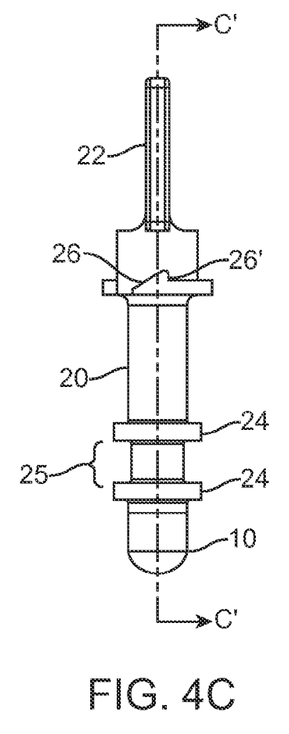
Figure 4D:
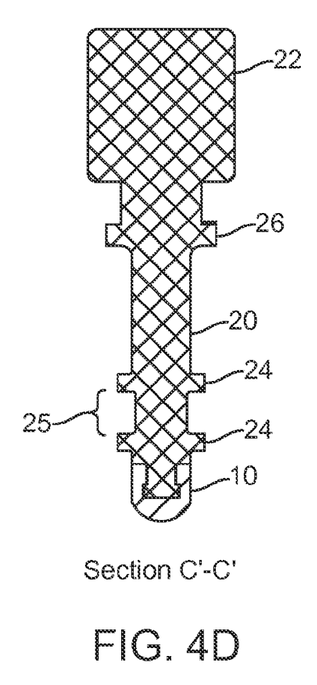

In one aspect, valve member 20 includes a ramp feature 26 extending radially outward from a portion of the valve member, typically near the proximal handle 22. The ramp feature 26 is configured to interface and engage with a corresponding ramp feature or helical component of valve housing 30 so as to translate rotation of the handle 22 into axial movement of the valve member along its longitudinal axis. For example, by turning handle 22, typically by about 90 degrees, ramp feature 26 engages helical ramp 36 thereby translating rotational movement of the handle 22 into axial movement of the valve member 20 along its axis between the open and closed valve position. The angled ramp feature may be shaped, as shown in FIG. 3C, as a wedge shape having a rear drop-off or stop portion 26', the angled ramp portion 26 of the wedge controlling the rate at which the valve member moves and the rear stop portion 26' of the wedge preventing rotation of the handle 22 beyond 90 degrees and preventing further retraction of the valve member 20. For example, as handle 22 is rotated, the sloped portion of ramp 26 engages a corresponding angled surface on the ramp feature on the valve housing axially translating the valve member 20, until the rear portion 26' engages against a corresponding stop surface 36' in the receptacle of the valve housing 30 through which the valve member 20 extends so as to stop axial movement of the valve member 20. In many embodiments, the rotation of the device from the full-open position to the full-closed position remains 90 degrees due to the particular design of the cooperating ramps and angles of the valve member 20 and valve housing 30, although it is appreciated that the cooperating ramps can be configured so as to operate between various other angular displacements if desired.

In many embodiments, the valve member 20 may also include one or more flanges 24 near valve-seal 10. In some embodiment, these flanges 24 may act to contain an o-ring to seal the lower portion of the valve member 20 to the housing and prevent fluid flow through the receptacle of the housing 30 through which the valve member 20 extends.

FIGS. 4A-4D illustrate an example valve member 20 having a cylindrical valve-seal 10 with a ball end. The valve-seal 10 may include any of the features discussed above with respect to FIGS. 3A-3D. Additionally, valve-seal 10 may include a variety of other shapes as needed for a particular application.

Figure 5A:
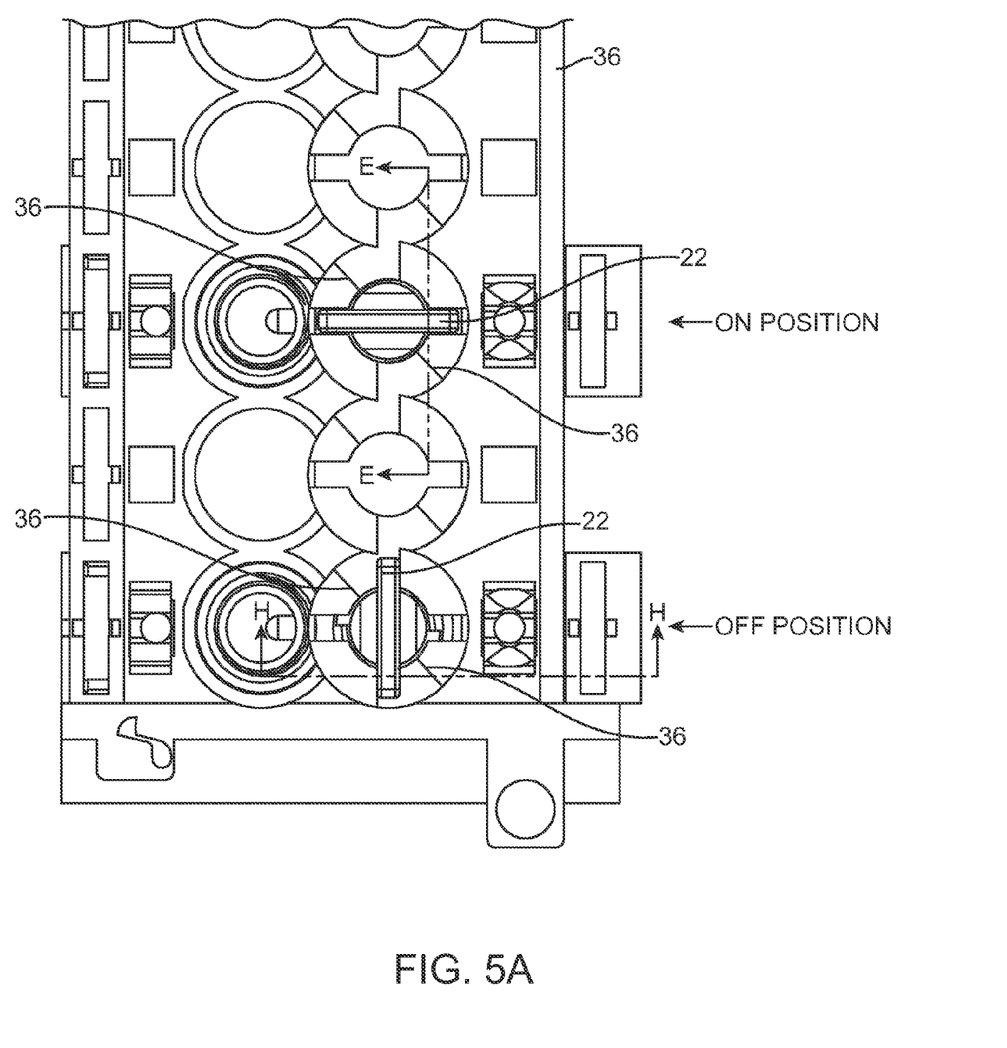
FIGS. 5A-5C illustrate an overhead view and cross-sections of portions of an example shut-off valve device, in accordance with many embodiments.

FIG. 5A illustrates an overhead view of two valve members 20 disposed within a valve housing 20 of an example valve assembly. In this embodiment, the valve housing 30 includes multiple receptacles for receiving corresponding valve member 20 so that the valve assembly can be used to provide multiple fluid flow paths, each having a fluid flow shut-off valve in accordance with the present invention. As seen in FIG. 5A, each of the receptacles in valve housing 30 includes a helical ramp feature 36 that corresponds to the angled ramp feature 26 on the side of valve member 20. As shown, the helical ramp feature 36 may includes one or more faces or sections of differing slope and/or length. The different slopes and lengths of the different faces allow for control of the travel distance and rate of travel as the valve member moves between open and closed positions.

Figure 5B:
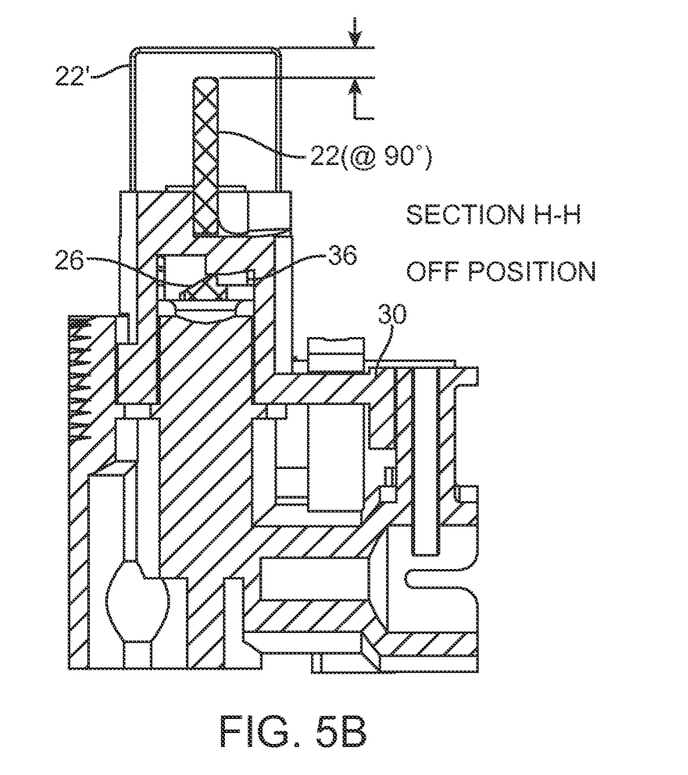

FIG. 5B shows a view of cross-section H-H from FIG. 5A. As can be seen in FIG. 5B, in the closed position the handle 22 is disposed relatively lower and turned perpendicular to cross-section (as shown by handle 22), while in the open position, the handle has been retracted away from the housing and turned parallel to cross-section H-H (as shown by handle 22'). Cooperation of the angled ramp feature 26 of the valve member 20 and the helical ramp 36 of the valve housing 30 provides that rotating the valve handle 22 by 90 degrees moves the valve member 20 from the "off" position to the "open" position by retracting the valve member 20 an axial distance (e.g. the actuator travel).

Figure 5C:
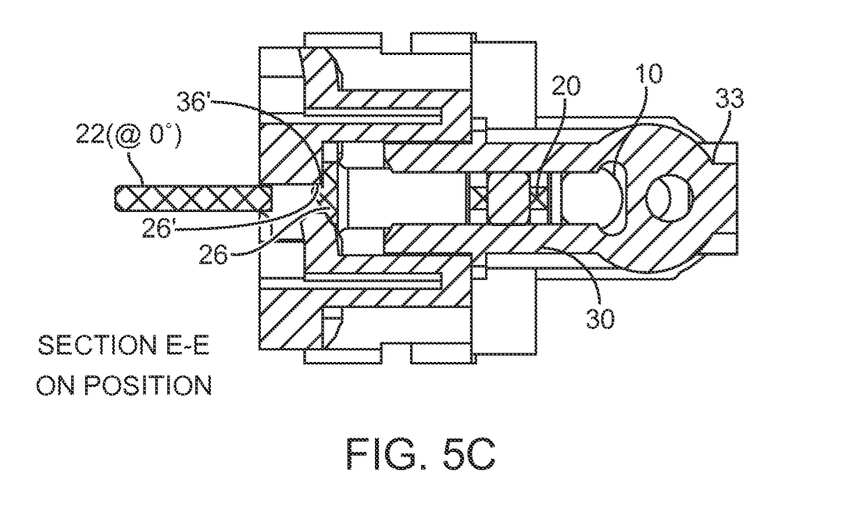

FIG. 5C shows a view of cross-section E-E from FIG. 5A. As can be seen in FIG. 5C, the engagement of the ramp stop location surface 36' against the rear wedge stop portion 26' of the valve member ramp 26 limits retraction of the valve member 22 beyond the "open position." Thus, the configuration of the cooperating angled and ramp features of the valve member 20 and valve housing 30 provides for improved control of movement of valve member 20 between the open and closing positions.

Figure 6A:
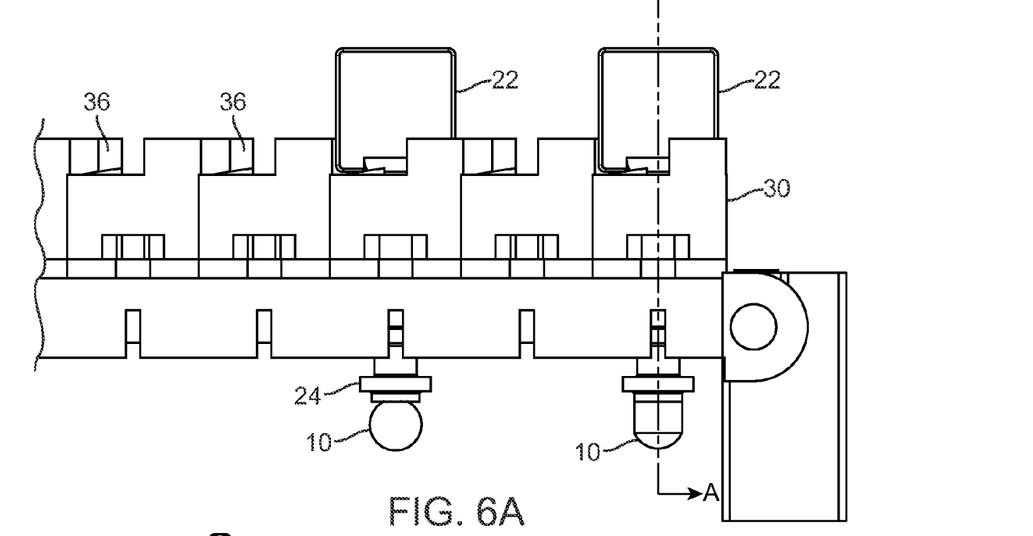
FIGS. 6A-6C illustrate a side view and cross-sections of portions of an example shut-off valve device, in accordance with many embodiments.
Figures 6B, 6C:
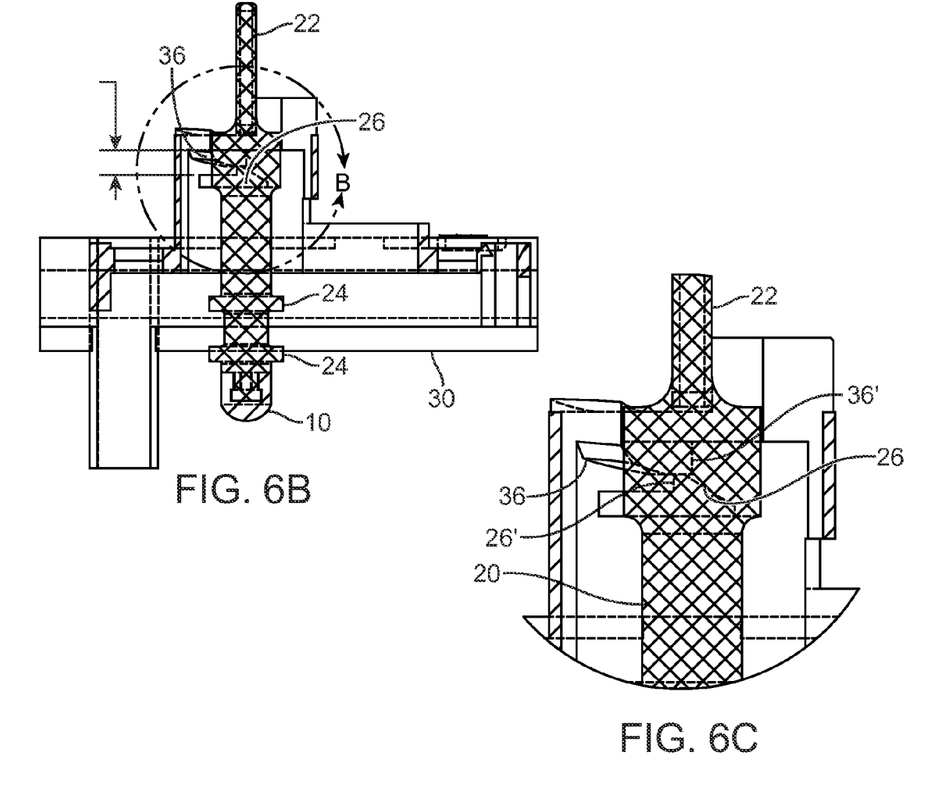

FIGS. 6A-6C show a side view of two valve members 20, each having a distal valve-seal 10, disposed within a portion of a valve housing 30. FIGS. 6B and 6C provide detailed views of cross-section A-A of FIG. 6A which illustrate how engagement of the angled ramp feature 26 (also known as the actuation ramp) of the valve member 20 against the helical ramp 36 of the valve housing 30 translate rotational movement of the handle 22 into axial movement of the valve member 20 between the open and closed positions.

Figure 7:
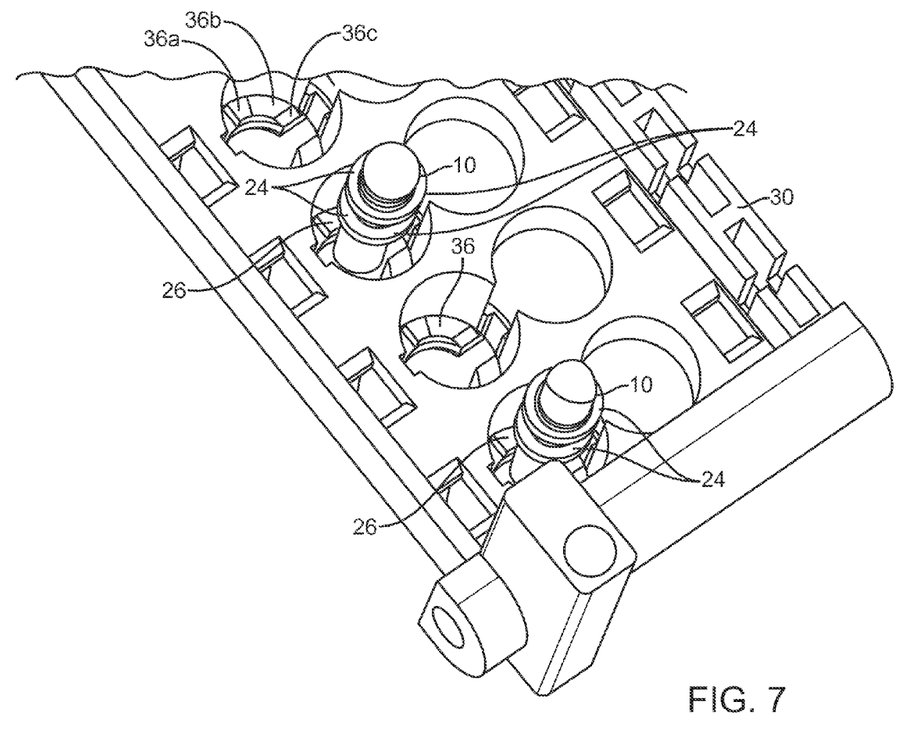
FIG. 7 illustrates an underside side view of a portion of an example shut-off valve device, in accordance with many embodiments.

FIG. 7 illustrates an underside view of two valve member 20, each having a distal valve-seal 10 extending through the valve receptacles of an example valve housing 30. As can be seen, each receptacle includes a helical ramp 36 comprises of three faces, 36a, 36b and 36c, each face having a different length and slope. The length of each face corresponds to an axial distance by which the valve member 20 travels during rotation of the valve handle 22. Utilizing faces of differing slope and length allows the translation of force from rotational movement of handle 22 to be utilized more efficiently and adjust the movement, as needed, thereby improving ease of use in operating the valve assembly.

The above description is illustrative and is not restrictive. Many variations of the disclosure will become apparent to those skilled in the art upon review of the disclosure. It is noted that a recitation of "a", "an" or "the" is intended to mean "one or more" unless specifically indicated to the contrary and that one or more features from any embodiment may be combined with one or more features of any other embodiment without departing from the scope of the disclosure. The scope of the disclosure should, therefore, be determined not with reference to the above description, but instead should be determined with reference to the pending claims along with their full scope or equivalents.

What is claimed is:

1. A shut-off valve assembly, comprising:
a valve housing having a fluid flow conduit extending therethrough and a valve-seating surface within the fluid flow conduit;
a valve member having a proximal end and a distal end, the valve member being axially movable between an open position and a closed position such that advancing the valve member distally moves the valve member to the closed position and proximally retracting the valve member moves the valve member to the open position, wherein the valve member is a single component; and
a valve-seal attached to the distal end of the valve member and configured to sealingly engage with the valve seating surface when the valve member is in the closed position, wherein when the valve member is in the closed position, the valve member and/or the valve-seal includes a proximal facing surface in fluid communication with a pressurized fluid upstream from the valve-seal such that the pressurized fluid upstream of the valve-seal provides a force component in the distal direction against the proximal facing surface to provide a positive sealing pressure, wherein the proximal facing surface comprises a portion of the valve-seal.

2. The shut-off valve assembly of claim 1, wherein the valve-seal comprises a bulbous feature disposed near the distal end of the valve member, wherein the bulbous feature sealingly engages with the valve-seating surface when the valve member is in the closed position.

3. The shut-off valve assembly of claim 2, wherein the bulbous feature comprises a spherical or semi-spherical surface that is circumferentially engageable with the valve-seating surface.

4. The shut-off valve assembly of claim 3, wherein the valve-seating surface circumscribes the fluid flow conduit through the housing.

5. The shut-off valve assembly of claim 3, further comprising a proximal handle attached to the proximal end of the valve member and configured for moving the valve member between the open and closed positions.

6. The shut-off valve assembly of claim 5, wherein the valve member comprises an angled ramp feature extending laterally outward from a longitudinal axis of the valve member, and wherein the housing comprises a helical feature engageable with the ramp feature of the valve member such that rotation of the proximal handle engages the ramp feature against the helical feature so as to directly translate rotation of the valve member into axial movement of the valve member along the longitudinal axis.

7. The shut-off valve assembly of claim 6, wherein the angled ramp feature includes a stop portion engageable with a stop feature on the housing such that rotation of the stop portion is engaged against the stop feature of the housing when the valve member is fully rotated and axially refracted into the open position.

8. The shut-off assembly of claim 1, wherein the valve member is integrally formed as the single component having a closed outer surface.

9. The shut-off assembly of claim 1, wherein the valve member is removable from the valve housing and the valve-seal is removable from the valve member to allow replacement of the valve-seal with an alternate valve-seal.

10. The shut-off assembly of claim 1, wherein the valve member is configured such that rotation of the proximal handle in one direction axially retracts the valve member allowing pressurized fluid flow through the valve-seating surface and rotation of the proximal handle in an opposite direction distally advances the valve member to sealingly engage the distal valve-seal with the sealing surface with a positive sealing force without springs.

11. A shut-off valve assembly comprising:
a valve housing having a fluid flow conduit extending therethrough and a valve-seating surface within the fluid flow conduit;
a valve member having a proximal end and a distal end, the valve member being axially movable between an open position and a closed position such that advancing the valve member distally moves the valve member to the closed position and proximally retracting the valve member moves the valve member to the open position, wherein the valve member is a single component;
a proximal handle attached to the proximal end of the valve member and configured for moving the valve member between the open and closed positions; and
a valve-seal attached to the distal end of the valve member and configured to sealingly engage with the valve seating surface when the valve member is in the closed position, wherein when the valve member is in the closed position, the valve member and/or the valve-seal includes a proximal facing surface in fluid communication with a pressurized fluid upstream from the valve-seal such that the pressurized fluid upstream of the valve-seal provides a force component in the distal direction against the proximal facing surface to provide a positive sealing pressure, wherein the valve-seal comprises a bulbous feature disposed near the distal end of the valve member that sealingly engages with the valve-seating surface when the valve member is in the closed position, the bulbous feature comprising a spherical or semi-spherical surface that is circumferentially engageable with the valve-seating surface,
wherein the valve member comprises at least two flanges near the valve-seal between which is disposed an o-ring to seal the valve member to the valve housing, wherein the at least two flanges, in combination with the o-ring, the valve housing and the valve-seal, define a chamber diverted from in-line flow when the valve member is in the closed position, the chamber being in fluid communication with fluid upstream from the valve-seating surface so as to provide the positive sealing pressure when the valve-seal is engaged with the valve-seating surface.

12. The shut-off assembly of claim 11, wherein the proximal facing surface comprises a portion of the bulbous feature of the valve-seal.

13. A method for controlling fluid flow, said method comprising:
providing a valve assembly having a valve housing having a fluid flow conduit therethrough and a valve member disposed therein, the valve member being a single component having a proximal end and a distal end, and a valve-seal attached to the distal end that is sealingly engageable with a valve-seating surface within the fluid flow conduit of the valve housing;
replacing a conventional valve assembly in a fluid dispensing system with the valve assembly, the conventional valve assembly having a rotatable ball-type seal for sealing fluid flow in a portion having in-line fluid flow through the valve assembly;
diverting the fluid flow from in-line flow to an upper chamber in a portion of the valve assembly that corresponds to the portion of the conventional valve assembly having in-line flow, wherein the upper chamber is defined by the valve housing, a flange of the valve member and associated o-ring, and the valve-seal when the valve member is in the closed position, so that the pressurized fluid upstream from the valve-seal provides a positive sealing force;
distally advancing the valve member along a longitudinal axis of the valve member from an open position to a closed position by imparting rotational movement to the proximal end of the valve member in one direction, wherein when in the closed position, the valve-seal is sealingly engaged with the valve-seating surface so as to prevent fluid flow through the conduit and pressurized fluid upstream of the valve-seal provides a force component in the distal direction against a proximal facing surface of the valve member and/or the valve seal to provide a positive sealing pressure; and proximally retracting the valve-seal along the longitudinal axis of the valve member by applying rotational movement to the proximal end of the valve member in an opposite direction, wherein when in the open position, the valve-seal is positioned a distance proximally away from the valve-seating surface so as to allow fluid flow through the conduit.

14. The method of claim 13, wherein axially moving the valve member comprises rotating a proximal handle attached to the proximal end of the valve member.

15. The method of claim 14, wherein axially moving the valve member comprises engaging a helical ramp of the valve housing with an angled ramp of the valve member rotating the proximal handle of the valve member.

16. The method of claim 15, wherein the angled ramp feature includes a stop portion engageable with a stop portion of the housing so as to limit the rotational and axial movement of the valve member within the housing.

17. The method of claim 13, wherein the valve-seal comprises a spherical feature attached to the distal end of the valve member and the proximal facing surface comprises a portion of the spherical feature.

18. The method of claim 13, further comprising:

removing the valve member from the valve assembly and replacing the valve-seal with an alternate valve-seal based on an application in which the valve-assembly is used.

19. The method of claim 13, wherein rotating of the proximal handle facilitates proximal retraction of the valve-member from the closed position to the open position and distal advancement of the valve-member from the open position to the closed position in which sealing engagement of the valve-seal positively seals pressurize fluid flow, without springs.

* * * * *